(No Model.)
H. STILL.
SCUFFLE HOE.
No. 318,148. Patented May 19, 1885.
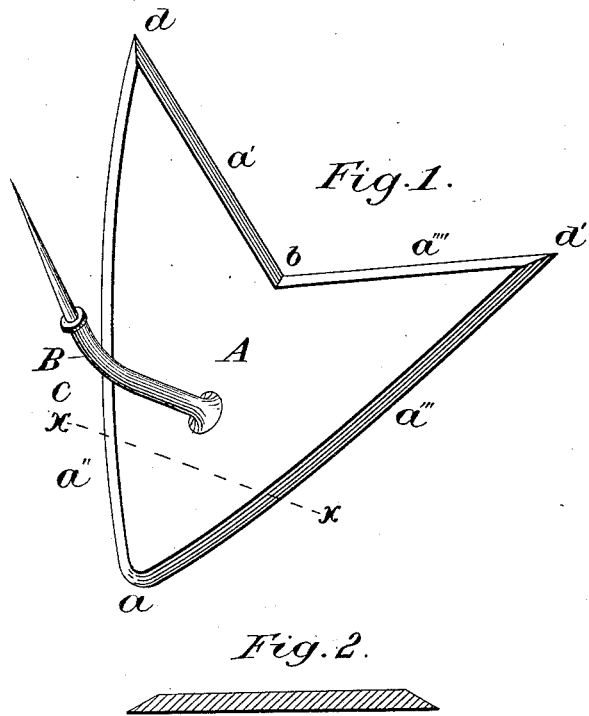
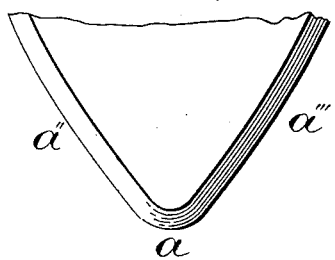
Witnesses:
James S Barber
W. H. Mitchell
Inventor:
Henry Still

UNITED STATES PATENT OFFICE.

HENRY STILL, OF BELOIT, KANSAS.

SCUFFLE-HOE.

SPECIFICATION forming part of Letters Patent No. 318,148, dated May 19, 1885.

Application filed March 1, 1884. (No model.)

*To all whom it may concern:*

Be it known that I, HENRY STILL, a citizen of the United States, residing at Beloit, in the county of Mitchell and State of Kansas, have invented certain new and useful Improvements in Scuffle-Hoes, of which the following is a specification, reference being had therein to the accompanying drawings, in which—

Figure 1 is a perspective; Fig. 2, a section on the line $x$ of Fig. 1, and Fig. 3 an enlarged view of the point $a$ of Fig. 1.

A represents the blade, which should be a plate of steel of any required thickness, but with a flat under surface; B, a shank attached to the central portion of the blade, to which shank a handle or shaft is affixed. The blade is of an irregular triangular shape, with its front cutting end slightly rounded and opposite and in line with the shank and angle $b$, with lateral edges $a''$ $a'''$, slightly curved or made straight, as may be desired, with the rear edges, $a'$ $a''''$, projecting inwardly and toward the median line of the blade from points $d$ $d'$, so as to form an acute angle with the lateral edges $a''$ $a'''$. The edges $a$ $a'$ $a''$ $a'''$ $a''''$ extend around the entire plate, and are beveled or rounded from the upper surface outwardly to the lower surface.

The shank B may be attached to the blade by any of the ordinary methods, formed integrally with a headed upset or riveted thereto, and the same may be perpendicular with the blade, or more or less curved, as shown at $c$, to which a handle or shaft is affixed for operating the same.

The operation and advantages of my construction of the hoe are as follows: The peculiar form is novel, simple, easy of guidance and of manufacture. By a reciprocal motion to cause the destruction of weeds without loss of much power, and with the use of a minimum amount thereof. By the peculiar position of the forward cutting-point, combined with the two rear points, the operator is enabled to work handily and effectively between and around growing plants without danger of injuring them. The form of the several cutting-edges, they being almost straight from point to point, allows the implement to be handily and easily kept in proper working condition. The perfectly flat under surface of the blade prevents the implement from clogging with dirt or soil while in use, as would be the case were the under surface of the blade curved or concave.

I am aware that diamond-shaped hoes have been constructed, and do not claim such as my invention, for such form, always presenting a rear horizontal line of cutting-edges to the work required, necessarily demands more power for successful operation, and to pass an obstruction or to remove a stalk by lateral motion requires an immense amount of lateral pressure as well as longitudinal force to accomplish the work. A pair of circular blades have also been constructed provided with means for adjusting them relatively with one another; but in this instance a convex enlargement or projection was formed on the rear cutting-edge, and other features of construction were embodied, adding to the complexity and disadvantage of the hoe.

I am aware that a true crescent blade, sharpened on the concave side only and having the handle attached to the convex side, has hitherto been constructed, and I do not claim the same as of my invention.

I am also aware that heretofore the Government has issued to me Letters Patent for a scuffle-hoe in the form of a true crescent; but because of the peculiar form of this blade, with the anterior cutting-point added to the two posterior points, this invention is an improvement thereon; and What I do claim as new is—

As a new article of manufacture, a hoe combining a blade having slightly-curved triangular-shaped cutting-edges $a''$ $a'''$, with the two rear cutting-edges, $a'$ $a''''$, projecting inwardly and toward the median line $b$ to $a$ of the blade from the points $d'$ $d$, so as to form an acute angle with the lateral cutting-edges $a'$ $a'''$, said edges being beveled or rounded from the upper surface outwardly to the lower surface, and a shank secured to the central upper surface of the blade for attaching a handle or shaft, substantially as shown and described.

In testimony whereof I affix my signature in presence of two witnesses.

HENRY STILL.

Witnesses:
J. W. JACOBS,
F. H. HART.